Patented Aug. 12, 1941

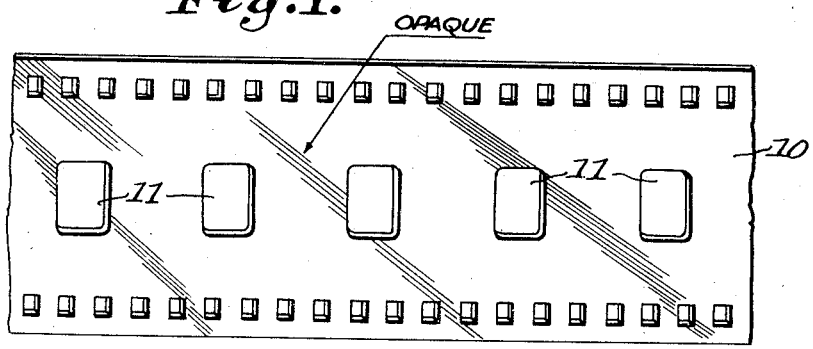
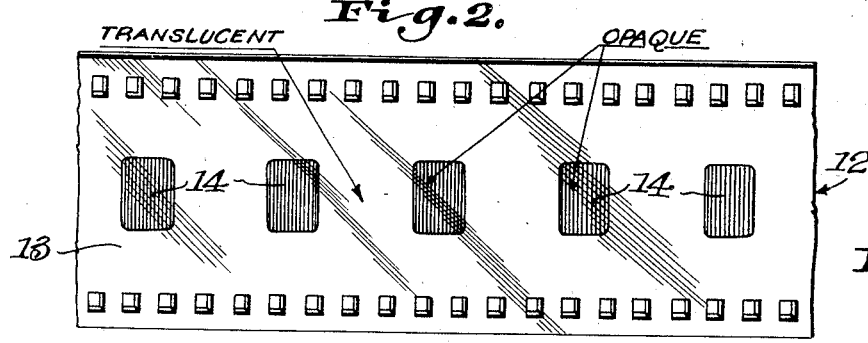
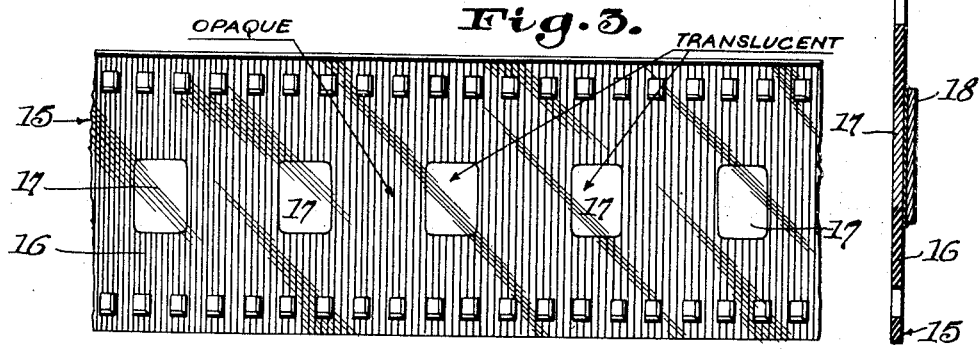
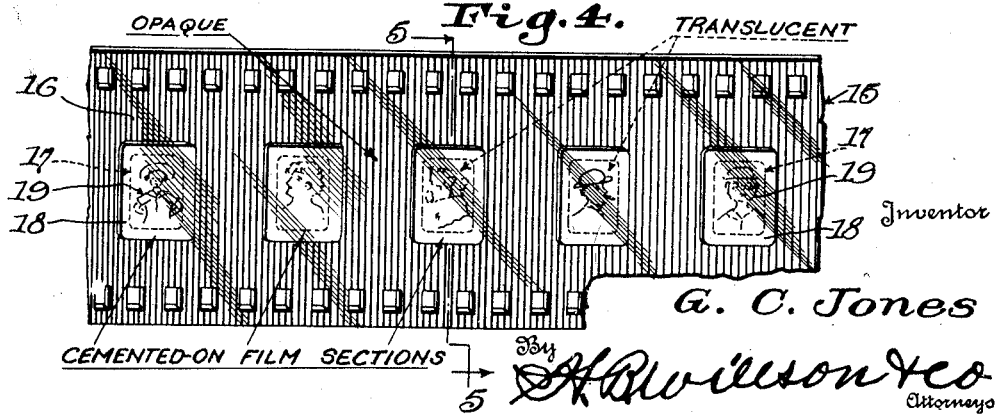

2,252,632

UNITED STATES PATENT OFFICE 2,252,632

PROJECTING FILM AND RELATED METHOD

Gerald C. Jones, New York, N. Y., assignor to Audi Vision, Incorporated, New York, N. Y., a corporation of New York Application May 23, 1940, Serial No. 336,807

6 Claims. (Cl. 88—26)

The invention relates to the mounting of individual film sections, having images, upon a master film, for projection as stills in a film strip projector. The invention is well adapted for mounting frames cut from standard 16 m. m. film upon a 35 m. m. master film strip, but is not restricted thereto.

The objects of the invention are to provide an improved composite film structure for projection purposes, an improved master film strip to carry the frames or images to be projected, a novel method for producing said composite film, and a novel method for producing said master film strip.

With the foregoing in view, the invention resides in the novel subject matter hereinafter described and claimed, the description being accomplished by reference to the accompanying drawing.

Figure 1 is a fragmentary perspective view showing a portion of an opaque film strip having uniformly spaced openings cut therein.

Figure 2 is a fragmentary perspective view showing a film strip having a translucent body and opaque zones, this strip being formed with the aid of that shown in Fig. 1.

Figure 3 is a fragmentary perspective view showing a portion of the complete master film or strip formed with the aid of the strip shown in Fig. 2 and having an opaque body with translucent zones.

Figure 4 is a fragmentary perspective view showing a portion of the complete composite film, a plurality of film sections or frames having images to be projected, being cemented against the translucent zones and the marginal opaque areas surrounding same.

Figure 5 is an enlarged detail sectional view on line 5—5 of Fig. 4.

The present disclosure constitutes a preferred form of the invention and will be specifically described, with the understanding, however, that within the scope of the invention as claimed, variations may be made.

In Fig. 1, 10 denotes a film strip of emulsion-coated Celluloid or the like corresponding to conventional film strips used in taking motion pictures, except that said film strip 10 is fully exposed and developed for maximum opacity, and is formed with uniformly spaced openings 11 punched or otherwise cut therethrough. If the film 10 be a 35 m. m. film, the spacing of the openings 11 will correspond to the spacings of the frames on a 35 m. m. film.

A negative copy 12 (Fig. 2) is formed from the opaque apertured film strip 10 shown in Fig. 1, said negative having a translucent body 13 and opaque zones 14, of course, spaced in the identical manner as the openings 11.

From the negative shown in Fig. 2, a positive 15 shown in Fig. 3 is produced, said positive having an opaque body 16 and translucent zones 17, the latter corresponding, of course, with the spacing of the openings 11 and the opaque zones 14 above described. In forming the positive film strip 15 with its opaque body and translucent zones 17, with the aid of the negative film strip 12 with its translucent body and opaque zones 14, any appropriate printer may be used, for example, a conventional step printer, and obviously by the use of said negative 12, as much of the positive or complete master film strip (Fig. 3) as required, may be produced.

The master film strip or carrier shown in Fig. 3 is used to carry a plurality of film sections 18 having images 19 to be projected, and said film sections may well be frames cut from a motion picture film of smaller standard size than any of the film strips 10, 12 or 15 above described. The film sections 18 are cemented tightly against the translucent zones 17 of the master strip 15 and are also cemented against the marginal opaque film areas surrounding said zones 17. The opaque film body 16 masks all portions of the frames or pictures which are not intended to be shown when the film is projected, and as the opacity of the strip 15 is formed by the emulsion on the film, an accurate clean cut edge to each picture area is provided.

In cementing the film sections 18 to the master strip 15, the cement may be applied evenly over the entire inner face of each of said film sections 18 and pressure may be used to cause the film sections to adhere to the master film strip. Therefore, uneven drying and expansion and contraction due to variations in temperature, cannot cause as much distortion of the film or the frames as if irregular cementing were involved.

From the foregoing, it will be seen that I have provided for the expeditious manufacture of a novel master film strip to carry film sections having images to be projected, and have provided also for the advantageous manufacture of a composite film strip for use primarily for projection of stills.

Obviously the invention is not restricted as to sizes or materials, and moreover, the image-carrying films 18, while preferably frames punched or otherwise cut from motion picture film, need not be of this nature.

I claim:

1. A method of producing a composite film strip for projection of stills, comprising the steps of producing a positive image-free film strip having an opaque body and longitudinally spaced centrally disposed uniformly translucent zones integral with said opaque body, and cementing separate image-carrying film sections against said translucent zones and the marginal opaque areas surrounding same.

2. A method of producing a composite film strip for projection of stills, comprising the steps of exposing the entire area of film strip, developing same to obtain opacity and cutting longitudinally spaced openings through the central longitudinal portion of said film strip, making a negative image-free copy of this opaque apertured film strip to produce an image-free negative film strip having a translucent body and opaque zones, the latter corresponding to said openings, from this negative printing a positive image-free strip having an opaque body and translucent zones, the latter also corresponding to said openings, and cementing separate image-carrying film sections against said translucent zones and the marginal opaque areas surrounding same.

3. A method of producing a master film strip to carry separate film sections having images to be projected as stills, comprising the steps of producing a negative image-free film strip having a translucent body and longitudinally spaced uniformly opaque zones along the central portion of and integral with said translucent body, and from this negative printing a positive image-free film strip having an opaque body and uniformly translucent zones integral with said opaque body; said translucent zones providing areas over which to cement the separate film sections to be carried.

4. A method of producing a master film strip to carry separate film sections having images to be projected as stills, comprising the steps of exposing the entire area of a film strip, developing same to obtain opacity and cutting longitudinally spaced openings through the central longitudinal portion of said film strip, making an image-free negative copy of this opaque apertured film strip to produce a negative image-free film strip having a translucent body and opaque zones, the latter corresponding to said openings, and from this negative printing a positive image-free film strip having an opaque body and translucent zones, the latter also corresponding to said openings and constituting areas against which to cement the separate film sections to be carried.

5. A composite film for projecting stills, comprising an image-free strip of Celluloid or the like having an opaque body and longitudinally spaced centrally disposed uniformly translucent zones integral with said opaque body, and separate film sections of Celluloid or the like cemented to said translucent zones and to the marginal opaque areas surrounding said zones, said film sections having images to be projected.

6. An image-free master film strip of Celluloid or the like to carry separate film sections having images to be projected as stills, said image-free master strip having an opaque body and longitudinally spaced centrally disposed uniformly translucent zones integral with said opaque body, said translucent zones providing areas over which to cement the separate film sections to be carried.

GERALD C. JONES.